United States Patent [19]

Martin

[11] 4,368,564
[45] Jan. 18, 1983

[54] CLIP FOR ASSEMBLING THE BASE TO THE TOP RING OF METAL FRAMEWORK TABLES

[75] Inventor: Leo Martin, Miami, Fla.
[73] Assignee: Miami Metal Products Inc., Miami, Fla.
[21] Appl. No.: 291,647
[22] Filed: Aug. 10, 1981
[51] Int. Cl.³ .............................................. A44B 21/00
[52] U.S. Cl. ................................................. 24/259 R
[58] Field of Search ................ 24/259 R, 255 R, 257; 403/397

[56] References Cited

U.S. PATENT DOCUMENTS 2,898,653 8/1959 Bedford, Jr. ...................... 24/259 R
3,978,554 9/1976 Miller, Jr. ......................... 24/259 R

*Primary Examiner*—Jay N. Eskovitz
*Attorney, Agent, or Firm*—Ernest H. Schmidt

[57] ABSTRACT

A generally rectangular, elongated, serpentine leaf spring clip for clamping each of a plurality of radially-outwardly-extending tubular members of a table base to a flanged ring surrounding and enclosing a table top panel is formed with arcuate recesses at each end, one of which recesses is adapted to embrace, in abutting relation, an outer end portion at the underneath of one of the tubular members, and the other end of which extends radially outwardly of the outer end of the tubular member so that when a screw extending through an opening in the spring clip flexes an arcuate portion thereof against its adjacent tubular member, the outer end will be urged outwardly and slightly downwardly to frictionally engage inner wall portions of the flanged ring for clamping the table assembly together.

4 Claims, 9 Drawing Figures

CLIP FOR ASSEMBLING THE BASE TO THE TOP RING OF METAL FRAMEWORK TABLES

BACKGROUND OF THE INVENTION

Casual furniture for indoor and outdoor use is often fabricated of bent metal members welded or otherwise secured together to provide both the supporting framework and a table top edge ring surrounding a flat table top panel, such as of glass. Commonly, the table top supporting framework or pedestal is fabricated of bent metal tubing providing, at the lower end, three or more spaced legs and, at the upper end, a like number of radially-outwardly-extending, horizontal support arms upon which the table top rests and the outer ends of which are secured to the table top ring at the inside to retain the table top panel, its surrounding ring and the base framework in interassembled relation. Heretofore, the tubular support arms were secured to the table top ring by sheet metal or machine screws extending through the ring from the outside and into formed openings or the like provided for this purpose at the outer ends of the support arms. With such construction, the table top panel is loosely constrained between an inwardly directed flange at the upper end of the table top ring, or is placed directly upon the top of the ring to be supported by its own weight.

It is, accordingly, the principal object of this invention to provide a novel and improved clip for assembling the base to the top ring of metal framework tables of the character above described that eliminates the necessity for drilling through the table top ring for the installation of assembly screws visible from the outside, and which besides serving to secure the top supporting framework or pedestal to the table top ring, also operates to clamp a glass table top panel or the like between the ring flange and the support arms of the table top framework.

A more particular object of the invention is to provide a spring clip of the character described which is of serpentine leaf spring configuration, and formed with arcuate recesses at each end, one recessed end of which is adapted to contact, in abutting relation, an outer end portion at the underneath of the radially-extending support arm portion of the table top base framework, and the other recessed end of which extends radially outwardly of the outer end thereof so that when a screw extending through an opening in the spring clip flexes an arcuate portion thereof against its adjacent tubular member, the outwardly-extending end will be urged outwardly and slightly downwardly to frictionally engage inner wall portions of the flanged ring for clamping the table assembly together.

Other objects, features and advantages of the invention will be apparent from the following description when read with reference to the accompanying drawings.

BRIEF DESCRIPTION OF THE DRAWINGS

In the drawings, wherein like reference numerals denote corresponding parts throughout the several views:

Referring now in detail to the drawings, reference numeral 10 in FIG. 1 designates, generally, a three-legged metal framework table having a circular glass top panel 11 rimmed by a table top ring 12, the leg assembly, glass top panel and top ring being held together in securely assembled relation by clips 13 embodying the invention (see FIGS. 2 through 7). As illustrated in FIG. 2, for example, the table top ring 12 is preferably fabricated by bending an extruded length of aluminum into circular shape and welding the ends together.

As illustrated in FIGS. 2 and 3, the table top ring 12 is formed with a peripheral side wall portion 14, the upper end of which merges into an inwardly directed flange portion 15, tapered along its inner edge, and the lower end of which is integrally formed with an inwardly-directed, rounded bead or lip 16.

Figure 1:
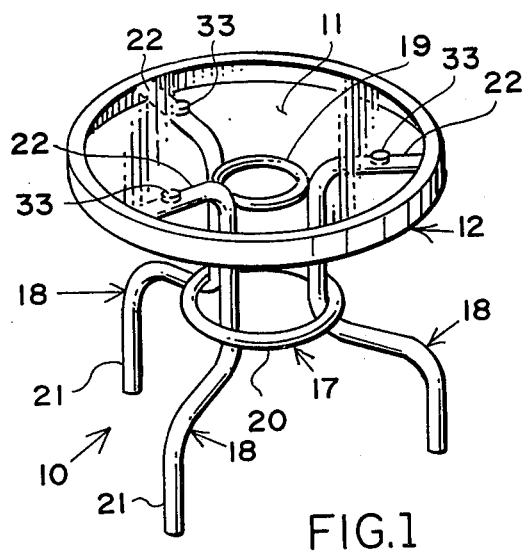
FIG. 1 is an oblique view as seen from above of a glass top metal framework table assembled with clips embodying the invention.

The leg assembly, designated generally by reference numeral 17 in FIG. 1, comprises a plurality (three in the embodiment illustrated) of bent tubular leg members 18 secured in equidistantly-spaced and radially-extending relation with respect to one another by vertically-spaced upper and lower rings 19, 20, respectively, to which they are welded or otherwise securely attached. As bent, leg members 18 provide support pedestal portions 21 at their lower ends, and radially-extending table top support arm portions 22, the outer ends of which support arm portions are securely attached to the table top ring 12 by clips 13 embodying the invention, as is hereinafter more particularly described.

Figures 7, 8:
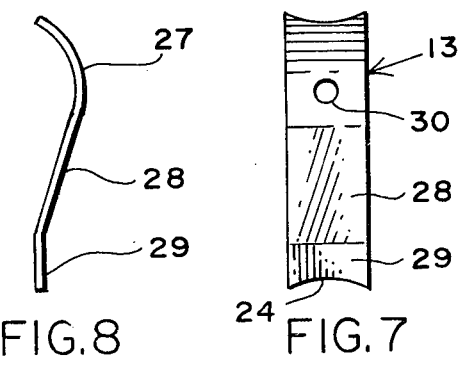
FIG. 7 is a top view thereof.
FIG. 8 is a side elevational view thereof.

As best illustrated in FIGS. 5 through 8, each leaf spring clip 13 is of an elongated shape and fabricated, by stamping, of sheet spring steel. The ends of the clip define inner and outer end concavities 23, 24, respectively, terminating at each lateral end in sharp points 25, 26. As best illustrated in FIG. 8, the leaf spring clip 13 is sinuously bent along its length to provide an arcuate portion 27 beginning at the inner end and extending into a substantially flat intermediate portion 28 terminating in a relatively short, slightly reversely-bent outer end portion 29. Approximately centrally along its length, the arcuate portion 27 of the clip is provided with a round opening 30 for the reception of an attachment screw during assembly, as is hereinafter more particularly described.

Figure 2:
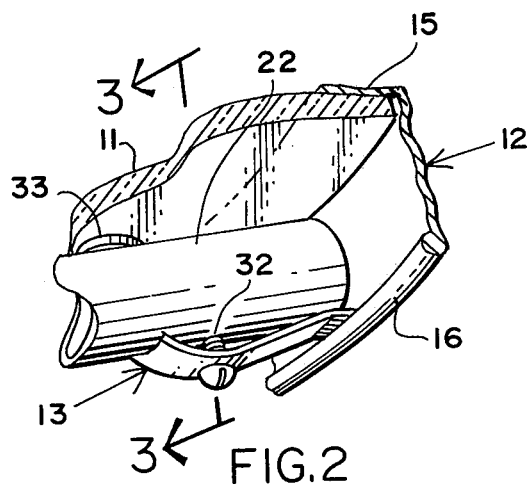
FIG. 2 is a partial view, in perspective, of the underside of a table top assembly illustrated in FIG. 1, showing use of a clip embodying the invention in securing one of the tubular supporting arms to the table top ring, while at the same time maintaining the glass table top panel in place.
Figure 3:
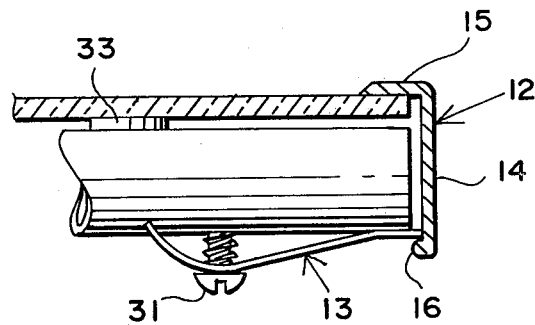
FIG. 3 is a longitudinal, cross-sectional view taken along the plane indicated at 3—3 of FIG. 2 in the direction of the arrows and illustrating the position of the clip before its securement in place.
Figure 5:
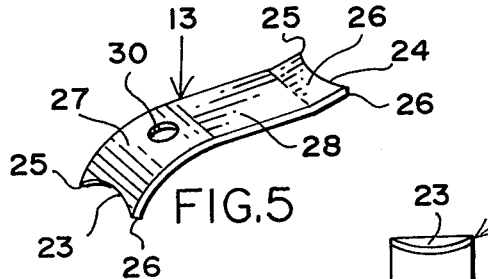
FIG. 5 is an oblique view of a clip embodying the invention, shown separately.
Figure 6:
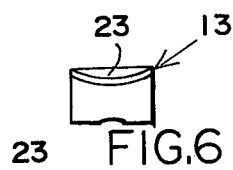
FIG. 6 is a back end view thereof.

Referring now to FIGS. 2 and 3, it will be seen that the diameter of the glass top panel 11 is just small enough in to pass the rounded lip 16 at the bottom of table top ring 12 upon its insertion for abutment against the flange portion 13 at the upper end of said ring. The leaf spring assembly 17 is placed so that its tubular support arm portions 22 are within the table top ring 12 and in abutment against under-side portions of the glass top panel 11. Flat rubber bumpers 33 will preferably be used to prevent direct metal to glass contact between the tubular arm portions 22 and the glass top panel 11. It is to be noted that the leg table top support arm portions 22 are of such length that the ends thereof lie close to inner surface portions of the table top ring side wall portion 14.

Figure 4:
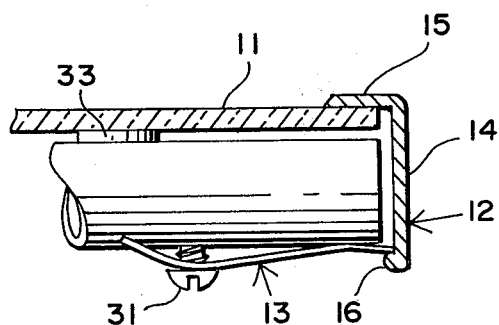
FIG. 4 is a longitudinal, cross-sectional view similar to that of FIG. 3, but illustrating the position of the clip after its securement in place.

In use of the leaf spring clips 13 for securing the table top ring 12, glass top panel 11 and leg assembly 17 together, sheet metal screw 31 are applied through clip opening 30 of a clip positioned with its inner arcuate concavity in contact with an outer peripheral wall portion of its associated leg table top support arm portion 22 and screwed into an opening 32 in said support arm portion. With use of round tubular arm portions 22, the arcuate shape of the inner clip cavity 23 will preferably be substantially the same and that of the said table top support arm portions. As best illustrated in FIGS. 3 and 4, the length of each clip 13 upon assembly is such that, before being secured in place, it extends just short of the inner surface of the table top ring sidewall portion 14, with the under-side of the outer end of the clip in close proximity to the upper edge of the rounded lip 16 of said table top ring. Upon screwing down upon the clips 13 to secure them firmly in place with use of attachment screws 31, the arcuate portions 27 thereof will be flexed inwardly against their respective tubular arm portions 22, causing the intermediate and outer end portions 28, 29 thereof to be forced radially outwardly so that the sharp outer end points 25, 26 dig into inner side wall portions of the table top ring in spaced relation thereabout to frictionally retain the table parts in assembled relation. At the same time, the slight reverse bend in the outer end portions 29 of the clips will be forced somewhat in the downward direction, as well as in the outward direction, in clamping engagement against the upper end of the lip 16 of table top ring 16, thereby more securely constraining the upper peripheral edge portion of the glass top panel 11 against the under-side of table top ring flange portion 15.

Figure 9:
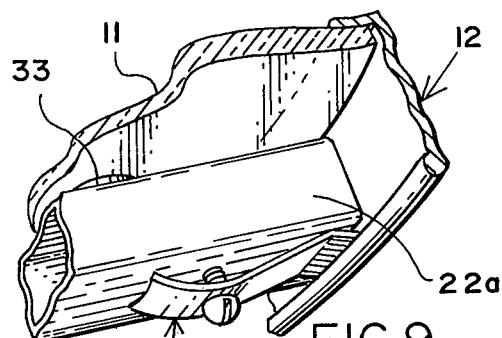
FIG. 9 is a view similar to that of FIG. 2, but showing how the clip can be used with tubular support arms of square cross-sectional shape as well as with support arms of round shape.

FIG. 9 illustrates how the clip 13 can be used with tubular arm portions 22a of substantially rectangular cross-sectional shape. With such use, the sharp inner end points of inner concavity 23 dig into underside portions of tubular arm portions 22a instead of establishing an embracing contact as with the round tubular arm portions illustrated in FIGS. 2 and 3.

While I have illustrated and described herein only one form in which my invention can be conveniently embodied in practice, it is to be understood that this embodiment is presented by way of example only, and not in a limiting sense. The invention, in brief, comprises all the embodiments and modifications coming within the scope and spirit of the following claims.

What I claim as new and desire to secure by Letters of Patent is:

1. In a clip for assembling the base to the top ring of metal framework tables of the type wherein the top ring has a peripheral sidewall providing a table top edge and an inwardly directed flange at the upper end of the sidewall for the seating thereagainst, from underneath, of the table top panel, and wherein the base is fabricated of bent metal tubing providing, at its lower end, a plurality of spaced legs and, at its upper end, a like number of outwardly-extending, horizontal support arms upon which the table top panel rests and the outer ends of which lie in close proximity to inner surface portions of the peripheral sidewall of the table top ring; the combination comprising, an elongated leaf spring member, said elongated leaf spring member being sinuously bent along its length to provide an arcuate portion beginning at the inner end thereof, said arcuate portion merging, at its outer end, with an intermediate portion, said intermediate portion, at its outer end, terminating in a reversely-bent outer end portion, said arcuate portion being provided with a through opening for the reception therethrough of an attachment screw, and an arcuate concavity formed transversely along said inner end of said elongated leaf spring member, whereby, upon the placement of the clip with its inner end in contact with an outer peripheral wall portion of an associated horizontal support arm at the outer end thereof and then attaching it thereto with a screw extending through said through opening, the outer end of said elongated leaf spring member will be forced outwardly to abuttingly engage an inner sidewall portion of the table top ring.

2. An assembly clip as defined in claim 1 and further including an arcuate concavity formed transversely along the outer end of said leaf spring member defining an opposed pair of corner points adapted to dig into inner sidewall portions of the table top ring.

3. An assembly clip as defined in claim 2 wherein said intermediate portion of said leaf spring member is substantially flat, and wherein said reversely-bent outer end portion thereof is relatively short as compared with said arcuate portion and said intermediate portion thereof.

4. An assembly clip as defined in claim 3 wherein, upon its attachment in place, the outer end of said elongated spring member will be forced downwardly as well as outwardly to abuttingly engage an inwardly extending peripheral lip formed at the lower end of the peripheral sidewall portion of the table top ring to clampingly urge the table top panel against the inwardly directed flange at the upper end of the top ring sidewall.

* * * * *